United States Patent
Clever et al.

(10) Patent No.: US 11,833,697 B2
(45) Date of Patent: Dec. 5, 2023

(54) METHOD OF PROGRAMMING AN INDUSTRIAL ROBOT

(71) Applicant: ABB Schweiz AG, Baden (CH)

(72) Inventors: Debora Clever, Zwingenberg (DE); Fan Dai, Zwingenberg (DE)

(73) Assignee: ABB Schweiz AG, Baden (CH)

( * ) Notice: Subject to any disclaimer, the term of this patent is extended or adjusted under 35 U.S.C. 154(b) by 397 days.

(21) Appl. No.: 17/172,098

(22) Filed: Feb. 10, 2021

(65) Prior Publication Data

US 2021/0162600 A1 Jun. 3, 2021

Related U.S. Application Data

(63) Continuation of application No. PCT/EP2018/073415, filed on Aug. 31, 2018.

(51) Int. Cl.
*B25J 9/16* (2006.01)
*B25J 13/08* (2006.01)

(52) U.S. Cl.
CPC .......... *B25J 9/1697* (2013.01); *B25J 9/161* (2013.01); *B25J 9/1605* (2013.01); *B25J 9/1666* (2013.01); *B25J 13/089* (2013.01)

(58) Field of Classification Search
CPC ........ B25J 9/1697; B25J 9/1605; B25J 9/161; B25J 9/1666; B25J 13/089; B25J 9/1671;
(Continued)

(56) References Cited

U.S. PATENT DOCUMENTS 4,987,765 A * 1/1991 Nishimura .......... B21D 43/105
83/563
2004/0151068 A1 8/2004 Carlsruh et al.
(Continued)

FOREIGN PATENT DOCUMENTS

CN 108267083 A 7/2018
WO WO 2018050307 A1 3/2018

OTHER PUBLICATIONS

Yun Jiang, S. Moseson and A. Saxena, "Efficient grasping from RGBD images: Learning using a new rectangle representation," 2011 IEEE International Conference on Robotics and Automation, Shanghai, China, 2011, pp. 3304-3311, doi: 10.1109/ICRA .2011. 5980145. (Year: 2011).*

*Primary Examiner* — Adam R Mott
*Assistant Examiner* — Matthew C Gammon
(74) *Attorney, Agent, or Firm* — Leydig, Voit & Mayer, Ltd.

(57) ABSTRACT

A method of programming an industrial robot includes: providing the robot, the robot having a robot arm with an end-effector mounted thereto which is controlled by a robot control unit to manipulate a workpiece which is arranged in a workplace of the robot; associating a target coordinate system with the workplace; taking an image of the workplace and the workpiece by an image capturing device; transmitting the image to a computing device having a human-machine-interface to generate control code for controlling the robot, which is transmitted to the robot control unit; capturing an image of the workplace and the workpiece to be manipulated by the robot; transferring the captured image to the computing device and displaying the captured image on a display associated with the computing device; and displaying the workpiece on the display; marking the workpiece with a marker-object on the display.

10 Claims, 10 Drawing Sheets

(58) Field of Classification Search
CPC ........ G05B 19/401; G05B 2219/40099; G05B 2219/40392
See application file for complete search history.

(56) References Cited

U.S. PATENT DOCUMENTS

| | | | |
|---|---|---|---|
| 2012/0072023 A1 | 3/2012 | Ota | |
| 2015/0331415 A1* | 11/2015 | Feniello | B25J 9/1661 |
| | | | 901/5 |
| 2018/0250822 A1* | 9/2018 | Shimodaira | B25J 9/1697 |
| 2018/0336724 A1* | 11/2018 | Spring | G06F 3/04845 |

* cited by examiner

METHOD OF PROGRAMMING AN INDUSTRIAL ROBOT

CROSS-REFERENCE TO PRIOR APPLICATION

This application is a continuation of International Patent Application No. PCT/EP2018/073415, filed on Aug. 31, 2018, which claims priority to International Patent Application No. PCT/EP2018/071870, filed on Aug. 13, 2018. The entire disclosure of both applications is hereby incorporated by reference herein.

FIELD

The invention is related to a method of programming an industrial robot.

BACKGROUND

Industrial robots are automated machines which can be programmed to perform different manipulation tasks incorporating spatial motion of their end-effectors like grippers or welding tools etc. Traditionally, industrial robots are programmed in procedural programming languages with motion control functions, typically with position and velocity as input parameters. This requires knowledge and skills about the programming language and the usage of the functions. In addition, the definition of appropriate and accurate position data and velocity profiles of the robot can be difficult and time consuming.

Commercial industrial robots are commonly supplied with a teach pendant by means of which an operator can "jog" the robot to move to a desired position and take this as an input parameter for the motion functions. Although this technique reduces the amount of manual data input, the jogging of the robot requires a lot of skill and experience and can be still time consuming.

Another technique that is being used for programming some robots is the so-called "lead-through" where the robot is taken by hand and follows the movement of the human hand. This can only be applied to robots that fulfill corresponding safety requirements and support such a mode of operation.

"Programming by demonstration" is a further technique by which human actions are tracked and interpreted to obtain robot instructions. One problem involved in this technique is that human gestures are interpreted with insufficient reliability and the desired parameters for controlling the robot motion cannot be obtained with the necessary accuracy. Moreover, it is a further shortcoming of this method that during demonstration of an assembly of small components, these components are often obstructed from view by the human hands themselves.

Object-oriented techniques using vision-based object localization require in general also the programing of appropriate vision jobs that is even more difficult to learn and to perform by application engineers.

WO 2018 050307 A1 of the applicant describes a method of programming an industrial robot, in which an image of the workplace of a robot and a workpiece to be manipulated by the robot are captured with a digital camera and the captured image is transferred to a computing device and displayed on a display which is associated therewith. The workpiece is displayed on a display screen and manually marked with a marker-object by the operator. After marking, the workpiece is manipulated in a sequence of subsequent manipulating steps which are associated to robot commands by means of the human-machine-interface. The sequence of manipulating steps includes two-dimensional position information of the marker-object in the coordinate system for displaying the marker-object on the display. The position information of the marker-object in the sequence of manipulating steps is afterwards transformed to positions of the workpiece in the target coordinate system of the robot and control code is generated from the transformed position information and associated robot commands for controlling the robot.

Although the system is easy and intuitively to handle and does not require sophisticated computing hardware, it does not provide for a high precision when grasping the object in the initial position and dropping the object in the target position due to the missing depth information. In order to obtain a higher precision when picking up the workpiece in the initial position and positioning the workpiece in the target position, the robot must be able to deal with this uncertainty which in turn requires a more sophisticated and expensive robot system.

US 2012/072023 A1 discloses a method of controlling a robot in which a two-dimensional image of what a robot sees is captured by two video cameras and is transmitted to a human-robot-interface-apparatus in form of a hand-held mobile phone device. On the display of the human-robot-interface-apparatus, the two-dimensional image of what the robot sees is displayed together with an action-support-tool-library which contains information relating to object manipulation patterns associated with a registered object and an object-recognition-support-tool-library which contains primitive shape attributes that are used to register an unregistered object the robot has encountered. The primitive shape attributes, which are stored in an object-recognition-support-tool-library are selected by a user who can assign a primitive shape attribute to an object that the robot was not able to automatically recognize.

In order to detect an object from the two-dimensional image, the human-robot-interface-apparatus attempts to automatically recognize the object shape patterns stored within the object-recognition-support-tool-library which are associated with the selected object. To do so, the HRI is programmed with an image-based object-recognition algorithm that receives the image of the selected object and compares it with registered object shape patterns.

The identification of the registered objects by means of image-based object-recognition-algorithms requires a high computing performance and sophisticated camera system and computing hardware, because it is usually not only one object which is disposed in a workplace. Therefore the system is expensive and difficult to handle.

SUMMARY

In an embodiment, the present invention provides a method of programming an industrial robot, comprising: providing the robot, the robot having a robot arm with an end-effector mounted thereto which is controlled by a robot control unit to manipulate a workpiece which is arranged in a workplace of the robot; associating a target coordinate system with the workplace; taking an image of the workplace and the workpiece by an image capturing device; transmitting the image to a computing device having a human-machine-interface to generate control code for controlling the robot, which is transmitted to the robot control unit; capturing an image of the workplace and the workpiece to be manipulated by the robot; transferring the captured image to the computing device and displaying the captured image on a display associated with the computing device; displaying the workpiece on the display; marking the workpiece with a marker-object on the display; manipulating the marker-object in a sequence of at least two subsequent manipulating steps which are associated with robot commands on the display by means of the human-machine-interface, the sequence of manipulating steps including positions of the marker-object in a coordinate system for displaying the marker-object on the display; transforming the positions of the marker-object in the sequence of manipulating steps to positions of the workpiece in the target coordinate system; generating control code for controlling the robot from the transformed positions and associated robot commands; measuring a first distance value between a reference point which is located above the workpiece and a first measuring location on the workpiece; measuring a second distance value between the reference point and a second measuring location on the workplace; determining a workpiece height value associated with the workpiece as a difference between the measured first distance value and the measured second distance value; and generating the control code and associated robot commands for controlling the robot based on the workpiece height value.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
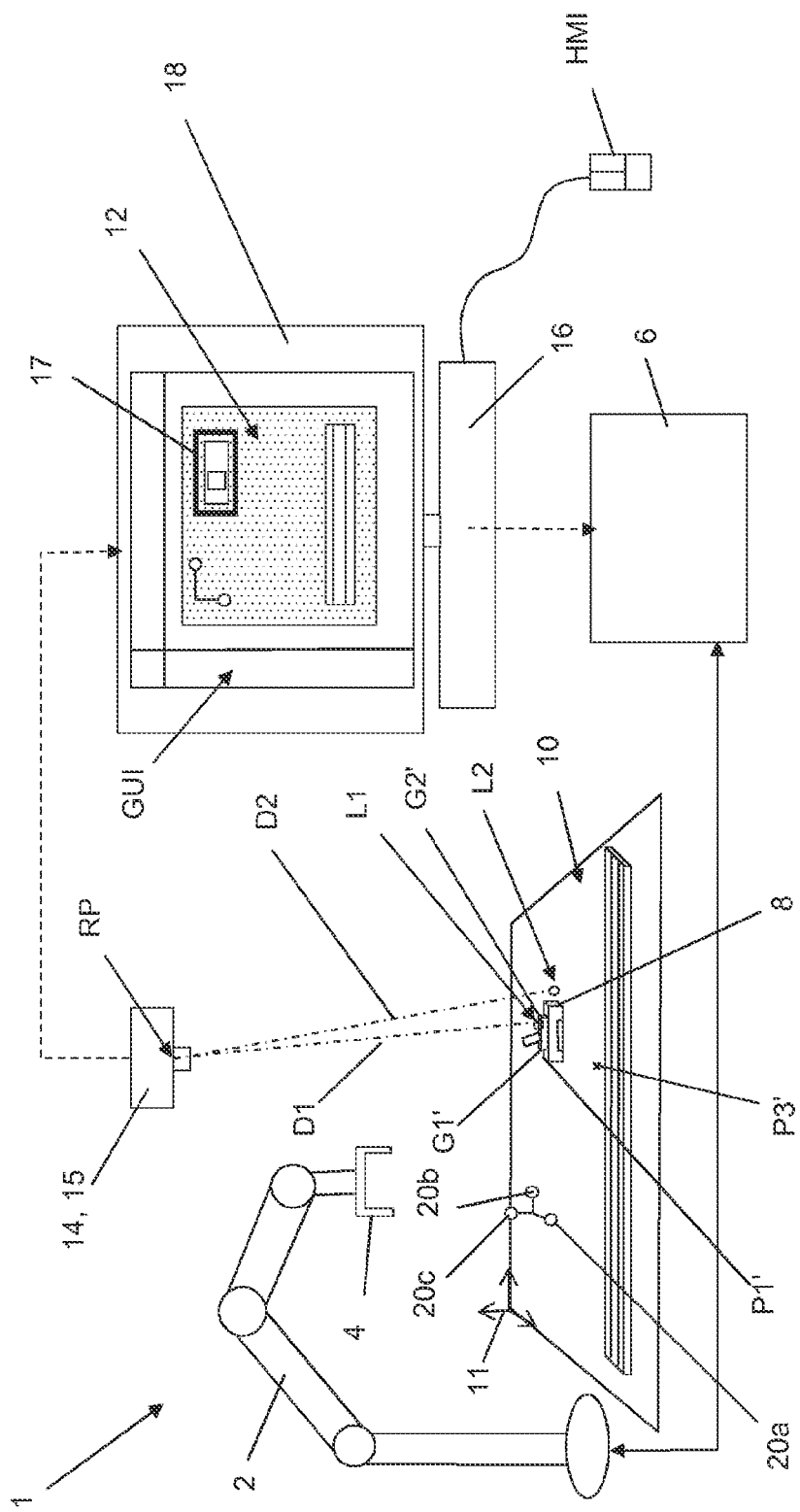
FIG. 1 shows a schematic overview of a robot and a workplace with a workpiece in the form of a fuse which has to be inserted into a rail, together with a computing device, a 3D-camera, a display and a robot controller for carrying out the method according to the present invention.

In an embodiment, the present invention provides a method which allows for an easy programming of a robot in an intuitive way with a high accuracy without involving sophisticated hardware.

According to the invention a method of programming an industrial robot, which has a robot arm with an end-effector mounted thereto that is controlled by a robot control unit to manipulate a workpiece arranged in a workplace of the robot, wherein a target coordinate system is associated to the workplace and an image of the workplace and the workpiece is captured by an image capturing device and transmitted to a computing device having a human-machine-interface to generate control code for controlling the robot which control code is transmitted to the robot control unit, the captured image is transferred to the computing device and displayed on a display associated to the computing device. The workpiece displayed on the display is marked with a marker-object on the display, the marker-object is manipulated in a sequence of at least two subsequent manipulating steps which are associated to robot commands on the display by means of the human-machine-interface, wherein the sequence of manipulating steps includes positions of the marker-object in a coordinate system for displaying the marker-object on the display, the positions of the marker-object in the sequence of manipulating steps are transformed to positions of the workpiece in the target coordinate system, and control code for controlling the robot is generated from the transformed positions and associated robot commands. The method comprises the following method steps:

Measuring a first distance value between a reference point which is located above the workpiece and a first measuring location on the workpiece, measuring a second distance value between the reference point and a second measuring location on the workplace, determining a workpiece height value associated to the workpiece as the difference between the measured first distance value and the measured second distance value and generating the control code and associated robot commands for controlling the robot on basis of the workpiece height value.

According to a further object of the invention, the method is characterized in that a workpiece grasping height value is determined from the workpiece height value as a value which is smaller, preferably 50% smaller, than the workpiece height value. The workpiece grasping height value represents the position calculated from the plane of the workspace, where the gripper of the end-effector of the robot is intended to grasp the workpiece before carrying out the further manipulating steps. This value may automatically be set to 50% of the workpiece height by means of the HMI, but can preferably optionally be changed manually by the operator by inputting a scaling factor via the HMI if he wants the robot to grip the workpiece at a position which is offset of a horizontal center plane running through the workpiece at 50% of the height.

In the preferred embodiment of the invention, the sequence of manipulating steps includes providing two parallel bars on the display, moving the two parallel bars to the marker-object by means of the human-machine-interface, rotating the parallel bars and moving the parallel bars towards and away from each other in order to define a grasping position of the gripper bars at which the workpiece is grasped by the robot, storing the grasping position together with the associated workpiece grasping height value, transforming the grasping position and the associated workpiece grasping height value to a transformed grasping position and an associated grasping height value of the workpiece in the target coordinate system and generating the control code for controlling the robot on basis of the transformed grasping position and grasping height value.

As the height of the workpiece is determined as a measured value which corresponds to the real height of the workpiece, the workpiece height value and the workpiece grasping height value calculated therefrom advantageously remain the same when transforming the sequence of manipulating steps with the positions included therein from the coordinate system for displaying the marker-object on the display to the transformed positions of the workpiece in the target coordinate system.

In order to also account for the target height of the workpiece when controlling the robot, which is important if the workpiece must be positioned on top of another object on the workplace in the final target position, a third distance value between the reference point and a third measuring location on the workplace is determined. This third measuring location corresponds to a prospected target position of the workpiece on the workplace after performing the sequence of manipulating steps. From the measured third distance value, a workpiece positioning height value which is associated to the workpiece in the target position is determined as the mathematical difference between the measured third distance value and the measured second distance value, that is the measured distance between the reference point and the even plane of the workplace adjacent the target position. In the same way as described hereinbefore with regard to the workpiece height value, the workpiece positioning height value is afterwards used to generate the control code and associated robot commands for controlling the robot. It represents a further advantage of the invention, that also the workpiece positioning height value is an absolute value which does not need to be transformed from one coordinate system to another, due to the base of the workplace being an even plane on which the workpiece and other objects are located.

In a first embodiment of the invention, the image capturing device is a 3D-camera which captures the image of the workplace together with measured distance values associated to at least some of the pixels of the captured image. After the image has been captured and the marker-object has been positioned around the workpiece in the image, the workpiece height value is determined as a difference between a first distance value and a second distance value. The first distance value is associated to a first pixel of the captured image that is located at the first measuring location. The second distance value is associated to a second pixel of the captured image that is located in the second measuring location.

The first measuring location where the first pixel is positioned in the displayed image is advantageously visually determined by the operator and selected with the HMI inside the marker-object after marking the workpiece, which intuitively allows an operator to identify the upper most top surface area of a workpiece which does not have a uniform even top surface, like the one shown in the drawings. The second measuring location which is preferably also visually determined by the operator and selected by means of the HMI and an associated pointer in the captured image is located outside of the marker-object, but adjacent to it in close proximity at a location, e.g. several mm away from the edge of the marker-object, which is visually identified by the user as an area of the even surface of the workplace on which the workpiece is initially positioned before carrying out the sequence of manipulating steps.

This allows for the advantage that no resource-intensive digital image processing of the captured image has to be done, in order to identify the first and second measuring locations on the workpiece and on the even plane of the workplace. Moreover, due to the fact that the operator can manually select the first and second measuring location in the image, the advantage is obtained that the distance between the two locations can be minimized as much as possible. As a result, the measuring error of the workpiece height/grasping height can be kept low, even if the angle between the reference point where the 3-D camera is located and the first or second measuring location, is not close to zero, due to the 3-D camera being not directly located above the workpiece when capturing the image.

According to another object of the present invention, the computing device is a handheld device like a cellular phone or a mobile touchpad which has a touchscreen display that serves as the display on which the image is displayed after capturing the same. In this embodiment the 3D-camera can be integrated in the handheld device, and may be a camera which is used to identify the user's face when accessing the user Interface of the handheld, as it is the case with the mobile phone.

Alternately the 3-D camera can also be mechanically connected to the handheld device, or as a further alternative, fixedly or temporarily mounted above the workplace which, as already mentioned herein before, preferably comprises an even surface on which the workpiece and other objects like a target object on which the workpiece has to be positioned by means of the robot 1 are located. In this embodiment, the digital 2-D image and the measured depth information which is associated to at least some of the captured pixels of the 2-D image are transmitted to the computing device inside the handheld or a known personal computer and displayed on a display screen connected thereto.

According to yet another alternative embodiment of the present invention, the first distance value and the second distance value are measured by means of a known rangefinder which comprises a light source, in particular a laser, that emits a light beam which is adapted to generate a first light spot on the workpiece and a second light spot on the workplace, when directing the rangefinder on the workpiece or on the workplace, respectively. Laser-rangefinders are known in the art and measure the flight time of the laser beam in order to determine the distance between the rangefinder and a surface which reflects the light beam. In order to measure the first and second distance from a reference point, the rangefinder is positioned above the workplace preferably at a location which is positioned right above the workpiece, so that the angle between the light beam and the normal at the first and second measuring location on the workpiece and on the workplace is as small as possible.

In a most preferred embodiment of the method, the rangefinder is located directly above the workpiece when measuring the first distance by pointing the light beam directly on the workpiece which may or may not have been marked with the marker-object in the captured image on the screen before. Afterward, the rangefinder is slightly tilted without moving it in the vertical direction until the light spot is located outside of the workpiece on the even surface of the workplace, in order to perform the measurement of the second distance at the second measuring location.

After measuring the first and the second distance values the measuring order of which may also be inverted, the measured first distance value and the measured second distance value are manually input into the computing device by means of the human machine interface which then preferably calculates the workpiece height value by subtraction of the values and stores it with the associated position information of the first and second measuring location, respectively.

According to an alternative embodiment, the workpiece height value may also be directly entered into the computing device as a digit by the operator who may have done the subtraction of the measured value before.

Although the workpiece height value may also be assigned to and stored with an unknown value of the initial position of the workpiece before marking the same with the marker-object, the workpiece height value is preferably assigned to the initial position of the marker-object in the coordinate system for displaying the captured image on the display screen after the workpiece has been marked by the operator with the marker-object.

As it is shown in FIG. 1, an industrial robot 1 having a robot arm 2 with an end-effector in form of a gripper 4 is controlled by a robot control unit 6, in order to manipulate a workpiece 8 which is arranged in the workplace 10 of the robot 1. In the workplace 10 which comprises an even surface that is preferably arranged in a horizontal plane, the movement of the robot 1/end-effector 4 is controlled in a target coordinate system 11 associated to the workplace 10.

Above the workplace 10 is located an image capturing device in form of a 3-D camera 14 which is adapted to capture a 2-dimensional digital image 12 of the workplace 10 and measures an associated distance of each or at least some of the pixels in the captured 2-D image which are stored e.g. in a digital file.

The captured image 12 together with the additional distance information is transmitted to a computing device 16 which is connected to a display 18 and which is operated by means of a human-machine-interface HMI in form of the shown computer mouse pointing device and a graphical user interface GUI for operating the program and inputting data.

The computing device 16 executes a software program which generates control code that is transmitted to the robot control unit 6 as it will be described hereinafter with reference to FIGS. 1 to 8.

Figure 2:
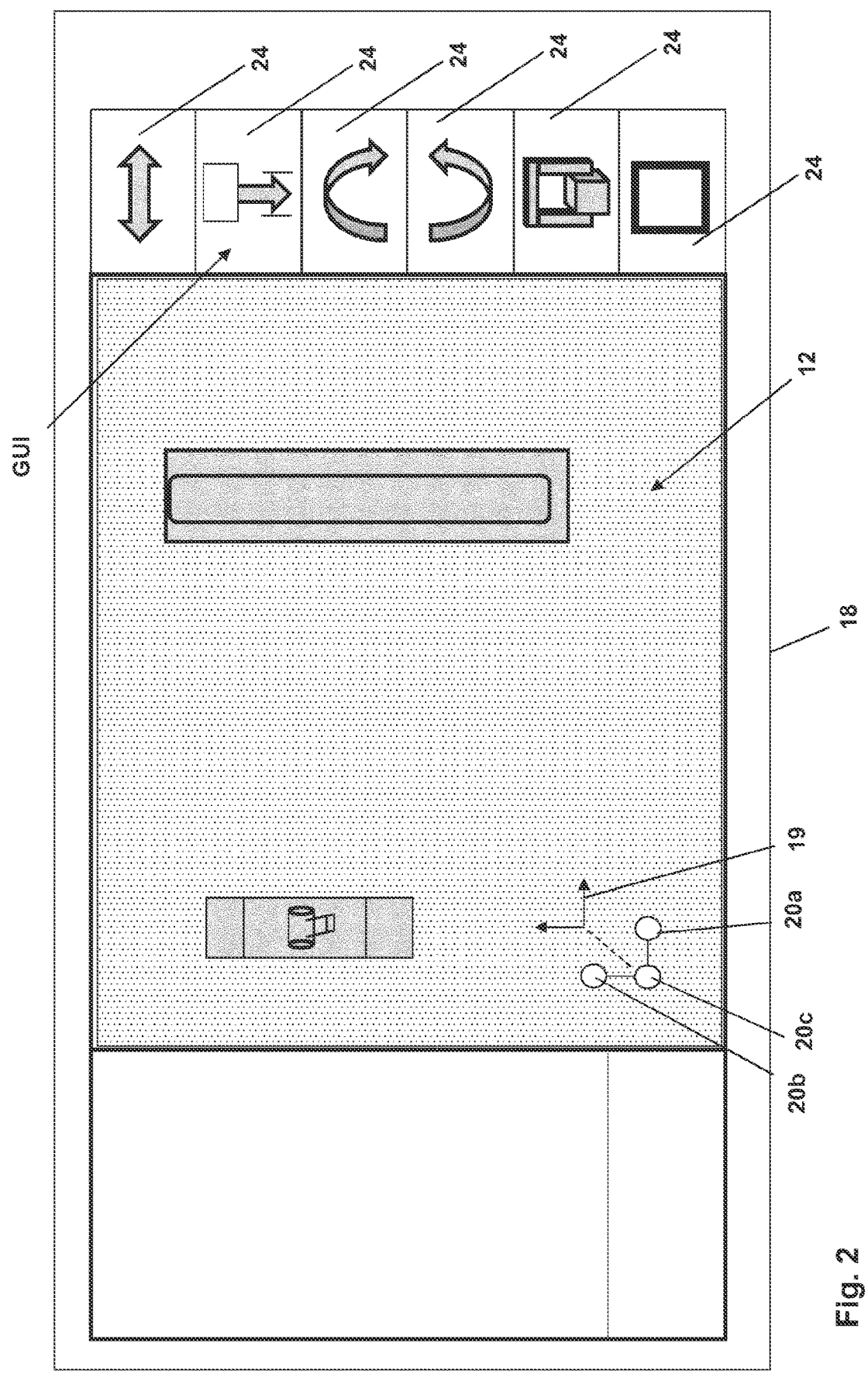
FIG. 2 is a schematic view of the display connected to a computing device of FIG. 1 on which a software program is executed having a graphical user interface with control buttons for programming the robot after capturing the image of the workplace of FIG. 1.

For programming the robot 1, the image 12 of the workplace 10 and the workpiece 8 arranged thereon is captured by means of the 3-D camera 14 and the digital file is loaded to the computing device 6. The computing device 16 displays the digital 2-D image on a known display 18 which is connected to the computing device 16, as it is shown in FIGS. 1 and 2.

As a next step, the operator visually identifies and marks the workpiece 10, or more precisely the area of the image 12 which corresponds to the workpiece 10, in the image 12 on the display 18 with a marker-object 17 that is provided by a software program that generates a graphical user interface GUI on the display 18.

Figure 3:
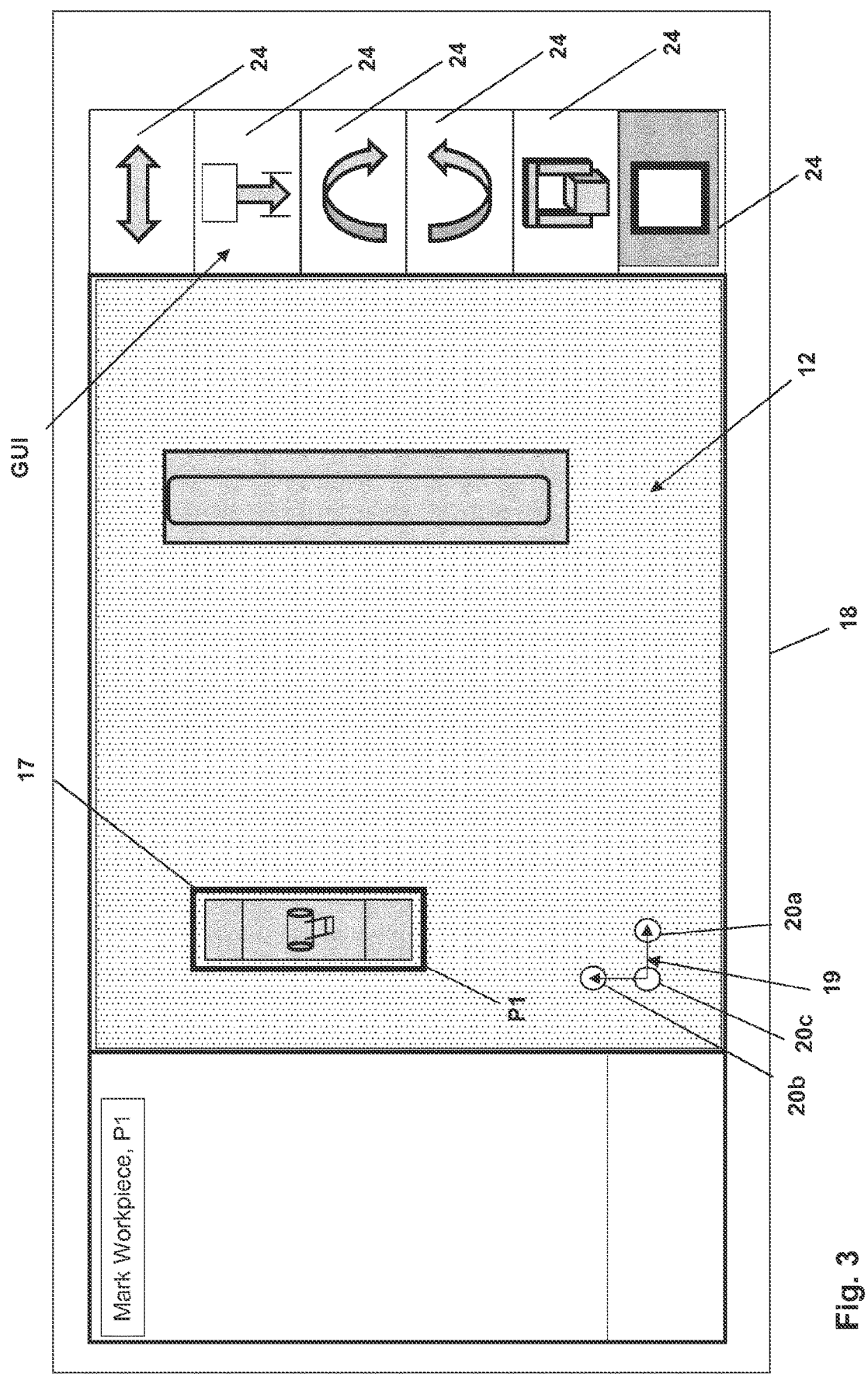
FIG. 3 shows the display with the graphical user interface when marking the image of the captured fuse with a marker-object in the form of a rectangular frame.

As it is shown in FIG. 3, the marker-object is preferably a rectangular frame 17, the size and/or position of which can be changed by means of the human-machine-interface HMI, as it is commonly known from image processing software programs running on personal computers, tablets or even mobile phones, for manipulating digital images.

After marking the image portion representing the workpiece 8 displayed on the display 18 with the rectangular frame 17, the image area inside the rectangular frame 17 is copied and joined to the rectangular frame 17 so that the copied image area is moved together with the frame 17 when moving the frame in the captured image in further programming steps. In order to allow a precise positioning of the marked object 17 the copied image area is preferably displayed on the captured image 12 as a transparent image area, so that the operator can recognize other objects which are located in the workspace and displayed in the digital image 12 on the screen 18, in order to exactly move the frame to a desired position.

After the workpiece 8 has been marked with the marker-object, a first measuring location L1 is identified inside the marker-object, which is preferably located inside the rectangular frame. To identify the first measuring location, the computing device may automatically suggest a measuring location inside the image as the location inside the marker-object 17, where the height of the workpiece is maximal. In order to determine the height at the measuring location L1, a first distance value D1 between the reference point RP in which the camera 14 is located and the first measuring location L1 on the workpiece 8 is measured. This may be automatically done by retrieving the distance values stored with each pixel inside the marker-object 17 from the digital file and select the pixel having the largest value.

Alternatively, the first measuring location may be selected inside the marker-object 17 by means of the HMI, e.g. by pointing at the desired location with a mouse pointer and pressing enter.

After the first measuring location L1 has been selected, a second distance D2 between the reference point RP and the plane of the workplace 10 near the first measuring location is determined.

This can be done in the same way as described herein before with regard to the first distance D1 by means of the GUI software running on the computing device 16, which retrieves the distance values assigned to pixels that are positioned just outside the marker-object 17, or alternatively by pointing to the desired second measuring location L2 on the display 18 with the HMI, e.g. with a mouse pointer and pressing enter.

As a next step, the workpiece height value WH which represents the height of the workpiece 8 positioned on the surface of the workplace 10 and the first measuring location L1 is calculated by the computing device 16 as the mathematical difference D1−D2 between the first and second distance values D1 and D2 assigned to the first and second measuring locations L1 and L2.

From this workpiece height value WH, a workpiece grasping height value GH is calculated which represent the positon where the workpiece 8 shall be grasped by the robot gripper bars 22a, 22b. The workpiece grasping height value may be automatically calculated by the computing device 16 as 50% of the workpiece height value WH and may optionally be reduced or increased by entering a scaling factor, e.g. an integer number between 0 and 100. The grasping height value GH is then stored in a memory of the computing device 16 from which it may be retrieved when generating the control code for the robot control unit 6 necessary.

As a next step, the marker-object 17 is moved and manipulated on the display in a sequence of manipulating steps by means of the human-machine-interface HMI. In each manipulating step, the position P1 to P5 of the marker-object 17 in a coordinate system 19 associated to the display 18 is recorded together with a command that is associated to a robot action.

In the preferred embodiment of the invention, the robot action can be selected by activating a control button 24 with the human-machine-interface HMI which is generated on the display next to the image 12. The activation of the control button 24 for a desired robot command, like "position gripper bars of end-effector", "grasp workpiece with end-effector", "move end-effector", "rotate end-effector" or "snap workpiece to other object" etc. adds the actual position P1 to P5 of the marker-object 17 and/or the grasping position G1, G2 of the gripper bars 22a, 22b of an end-effector together with a command which is associated to a desired action of the robot 1 to a sequence of manipulating steps.

Figure 4:
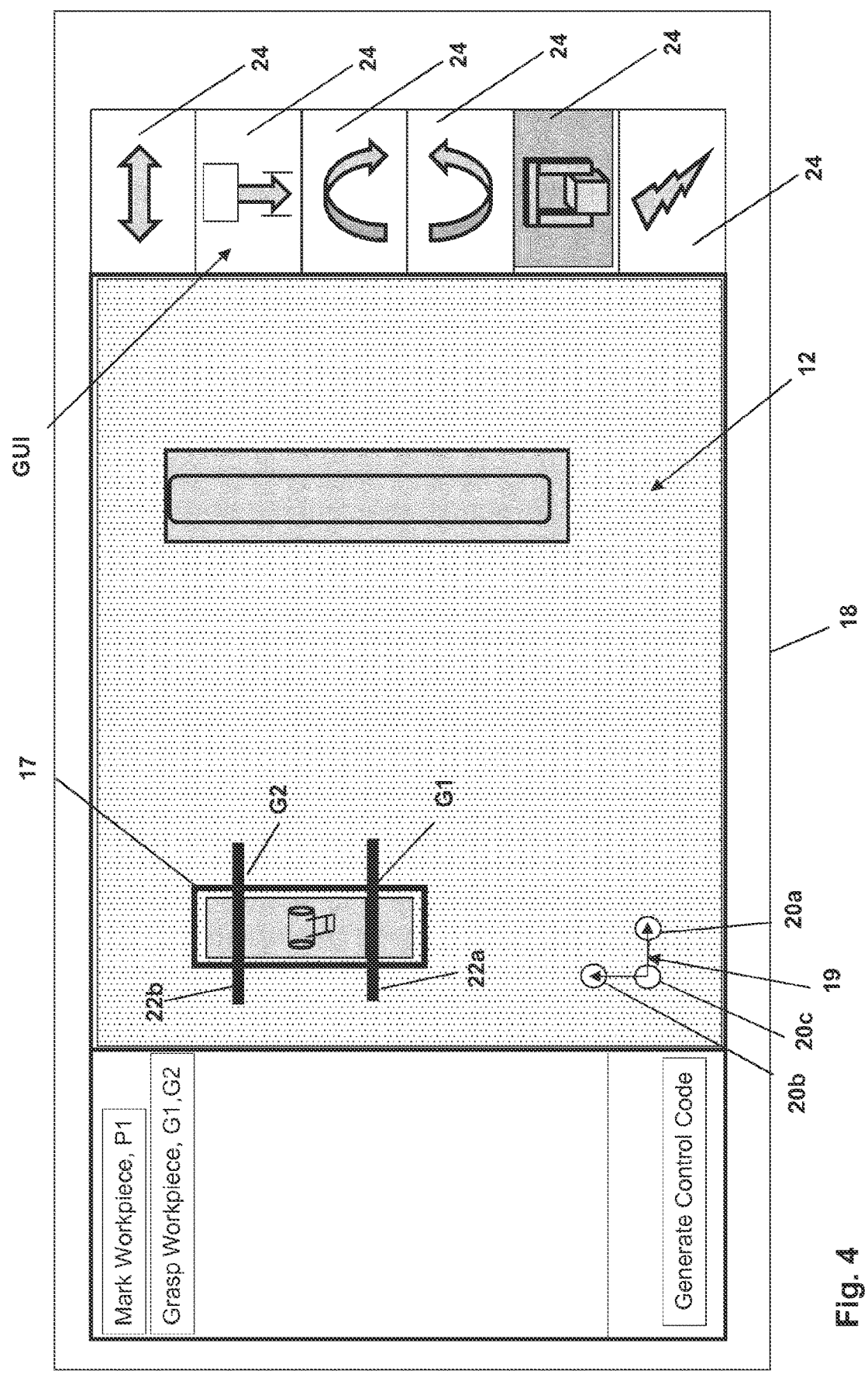
FIG. 4 shows the display with the graphical user interface after activating a control button for grasping the workpiece.
Figure 5:
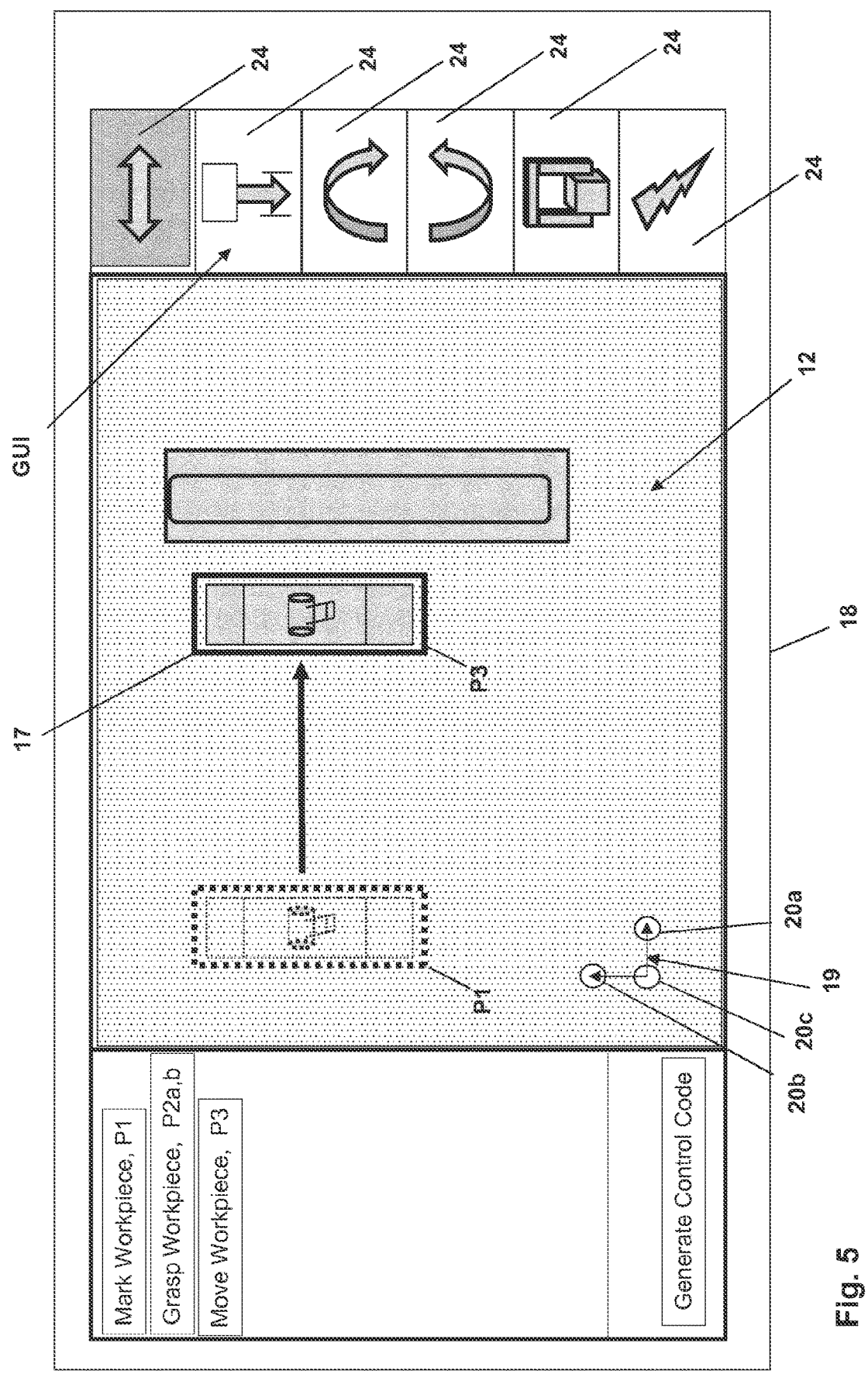
FIG. 5 shows the display with the graphical user interface after activating a control button for moving the marker-object with a copy image to the new position in the captured image shown on the display.

In the preferred embodiment of the invention, the sequence of manipulating steps includes the step of providing two parallel bars 22a, 22b on the display 18, as it is shown in FIG. 4 which can be positioned near the marker-object 17 by means of the human-machine-interface HMI and rotated to a position in which the bars 22a, 22b are aligned to the sides of the marker-object 17. Afterwards, the parallel bars 22a, 22b can be moved towards and away from each other in order to define a grasping position G1, G2 of the gripper bars 22a, 22b in which the workpiece 8 is grasped by the robot 1. The grasping positions G1 and G2 are also stored in the sequence of manipulating steps and transformed to the target coordinate system 11 of the workplace (robot) as described herein below.

As the height of the workpiece is determined as a measured value which corresponds to the real height of the workpiece 8, the workpiece height value WH and the grasping height value GH which is calculated therefrom advantageously remain the same when transforming the sequence of manipulating steps with the positions P1 to P5 included therein from the coordinate system 19 for displaying the marker-object 17 on the display 18 to the transformed positions P1' to P5' of the workpiece 8 in the target coordinate system 11. Therefore, the grasping-height value GH may only be stored in the memory of the computing device 16 from where it can directly be submitted to the robot controller 6.

After the marker-object 17 has been placed in the desired target position and the manipulation of the marker-object 17 on the display 18 has been completed, the positions P1 to P5 of the marker-object in the coordinate system 19 of the display 18 are preferably stored together with the associated commands and are afterwards transformed to positions P1' to P5' which correspond to the workpiece 8 in the target coordinate system 11 of the workplace 10, as it is indicated in the drawing of FIG. 1.

In the preferred embodiment of the invention, the transformed Positions P1' to P5' of the manipulating steps are stored together with the commands as a transformed sequence of manipulating steps from which either the computing device 16 or the robot control unit 6 generates the final control code for controlling the robot 1, to move the workpiece 8 in the workplace 10 to the desired target position P5'.

According to a further aspect of the present invention, the positions P1 to P5 of the marker-object 17 in the sequence of manipulating steps may be stored together with the associated manipulation command or robot commands and the grasping-height value GH in a data set. This data set may be transformed by a known transformation method to a further data set which includes the transformed positions P1' to P5' of the workpiece 8 in the target coordinate system 11 of the workpiece 10. However, this coordinate system 11 can be different from the internal coordinate system of the robot 1, so that a further known transformation of the further data sets might be necessary, which shall be included in the transformation of the position data P1 to P5 in the sequence of manipulation steps as described in this application.

According to another aspect of the present invention, at least two reference points 20a, 20b, 20c may be located on the workplace 10 before capturing the image 12, as it is shown in FIG. 1. The reference points 20a, 20b, 20c may be markers or the ball shaped end portions of a tripod shown in FIG. 1 which define a fixed reference position for the robot 1 in the target coordinate system 11 of the workplace 10. In order to calibrate this reference position, the operator can manually jog the end-effector 4 of the robot 1 to this reference points 20 and store the position in the robot control unit 6.

After loading the captured 2-dimensional digital image 12 of the workplace 10 captured with the 3-D camera, which also shows the reference points 20, into the computing device 6, the operator identifies the image portion of the reference points 20a, 20b, 20c in the captured image 12 by means of the human machine interface HMI, e.g. by clicking on the points 20 with a mouse pointer. The position data of each reference point 20a to 20c is stored in the computing device 6 and matched to the position data of the ball shaped end portions of the tripod taken by the robot 1 as described herein before. Alternatively, it is also conceivable to permanently attach the reference points 20 to a fixed position which is known to the robot control unit 6. From the position data of the reference points 20a, 20b, 20c in the target coordinate system 11 which are stored in the robot control unit 6 and the identified corresponding image portions of the reference points in the captured image 12 a scaling factor and/or an angular offset between the coordinate system 19 associated to the displayed image 12 and the target coordinate system 11 can be calculated.

As an alternative method of matching the coordinate system 24 associated to the displayed image 12 and the target coordinate system 11, the captured image 12 on the display 18 may be rotated on the display and/or expanded in vertical and horizontal direction of the display, until the length and orientation of the arrows indicating the coordinate system 19 matches the length and orientation of the corresponding portions of the tripod, as it is indicated in FIG. 2 and FIG. 3. This embodiment of the method allows a very simple programming of a robot 1 when using a computing device 16 in the form of a handheld device which has an integrated 2-D camera or 3-D camera 14, because the transformation of the position data in the sequence of manipulating steps can be done by multiplying the horizontal and vertical position of a key position in which a manipulation of the marker-object 17 is done with the respective scaling factors.

In order to increase the precision of programming, the handheld device or the camera 14 may be mounted to a supporting frame located above the workplace 10 for capturing the captured image in a plane which is entirely parallel to a plane of the workplace 10.

A typical workflow with the system is now being described hereinafter with reference to an exemplary embodiment of the method shown in FIGS. 2 to 8.

After capturing and loading the image 12 of the workplace 10 with the reference points 20a, 20b, 20c and workpiece 8 to be manipulated which are captured as a 2-D image with additional distance information into the computing device 16, the operator rotates and expands the image 12 such that the shown arrows which represent the coordinate system 19 associated to the display 18 superpose the images of the reference points 20a and 20b, as it is shown in FIGS. 3 to 8.

In a next step, the operator activates the control button 24 (highlighted) which generates the marker-object 17 which the operator moves and resizes to the rectangular frame until it surrounds the image portion of the workpiece in the image 12. The position P1 of the frame is stored as an initial key position of the frame in the sequence of manipulating steps in the control device.

As soon as the marker-object 17 has been positioned on the screen, the computing device 16 retrieves the distance values which are associated to the pixels located inside the marker-object 17 and determines the pixel having the lowest value as the first measuring location L1 and the associated distance value as the first distance value D1. Afterwards, the computing device 16 retrieves the distance information associated to pixels which are located just outside of the marker-object 17, e.g. 10 to 100 pixel away from the outer border of the rectangular frame, as the second measuring location L2, and retrieves the associated distance value as the second distance value D2.

Alternately, the pixels of the first measuring location L1 inside the marker-object 17 and also outside thereof may be selected by means of the HMI, and the associated distance values D1 and D2 may be automatically retrieved by the computing device 16 from the file of the captured 3D-image.

The computing device afterwards calculates the mathematical difference of the retrieved distance values D2−D1 and stores the calculated value as the workpiece height value WH.

From the workpiece height value WH, the computing device 16 afterwards calculates a workpiece grasping height value GH which is determined as a value that is preferably 50% of the workpiece height value WH. The workpiece grasping height value represents the vertical position calculated from the plane of the workspace 10, where the operator wants the gripper of the end-effector of the robot 1 to grasp the workpiece before carrying out the further manipulating steps. This value may automatically be set to 50% of the workpiece height by means of the HMI, but can optionally be changed manually by the operator by inputting a scaling factor via the HMI if he wants the robot to grip the workpiece at a position higher or lower.

As further shown in FIG. 4, the operator then activates a control button 24 (highlighted) which is associated to positioning and grasping the workpiece 8 by means of a gripper 4 which is shown as an end-effector or tool of the robot 1 in FIG. 1. By rotating and moving the two bars 22a and 22b the bars are located in the desired grasping positions G1, G2 of the gripper 4 in the image 12 which are also stored in the sequence of manipulating steps, preferably together with the workpiece grasping height value GH.

In a next step (FIG. 5), the operator activates the control button 24 which is related to lifting and moving the workpiece 8, or to be precise, the gripper 4 attached to the robot arm 2. By clicking on the frame 17 and pulling the same in a way as it is known from prior art image processing programs, the frame is positioned at the desired position which is saved together with the associated robot command as position P3 in the sequence of manipulating steps.

Figure 6:
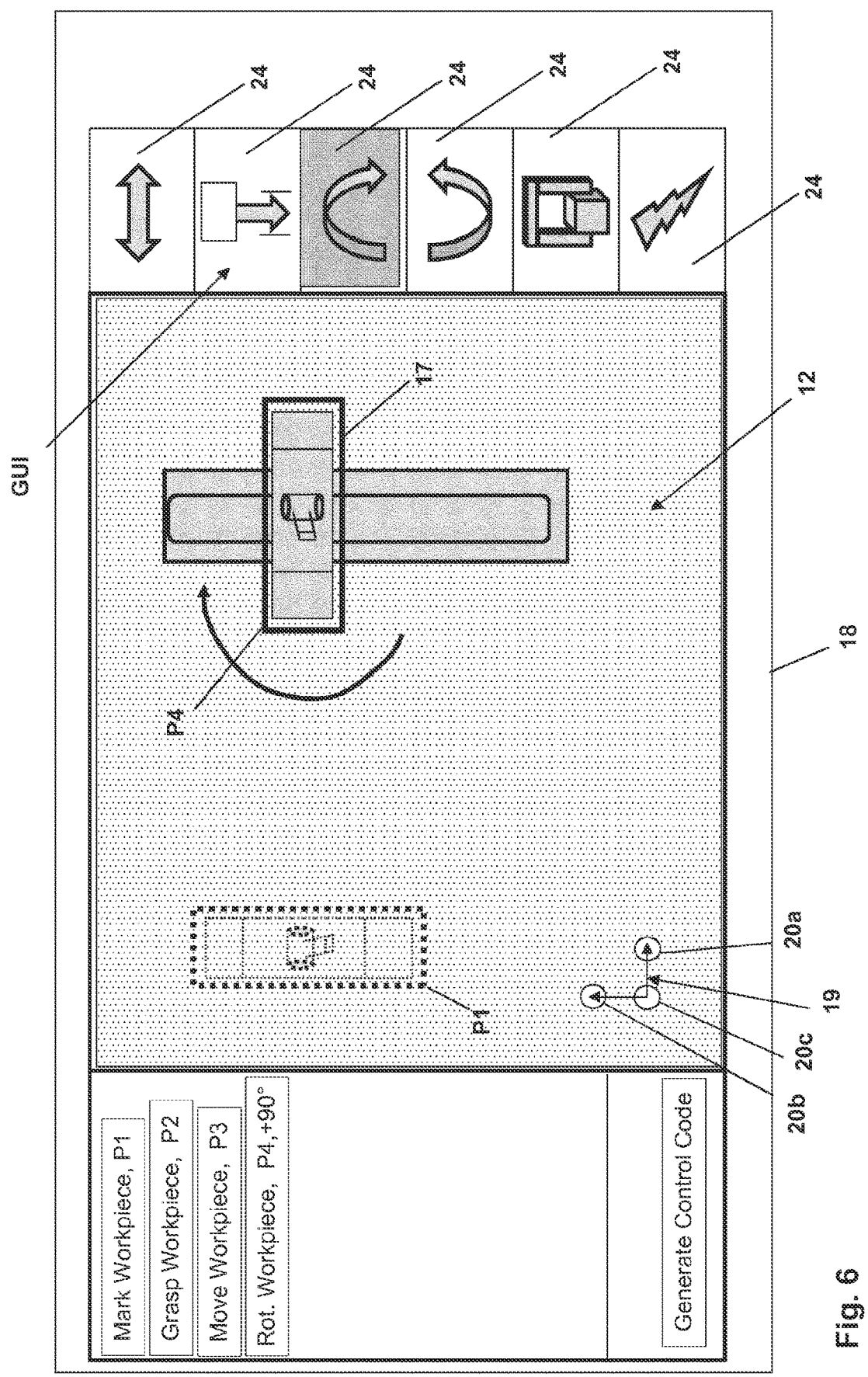
FIG. 6 shows the display with the graphical user interface after activating a control button for rotating the marker-object.
Figure 7:
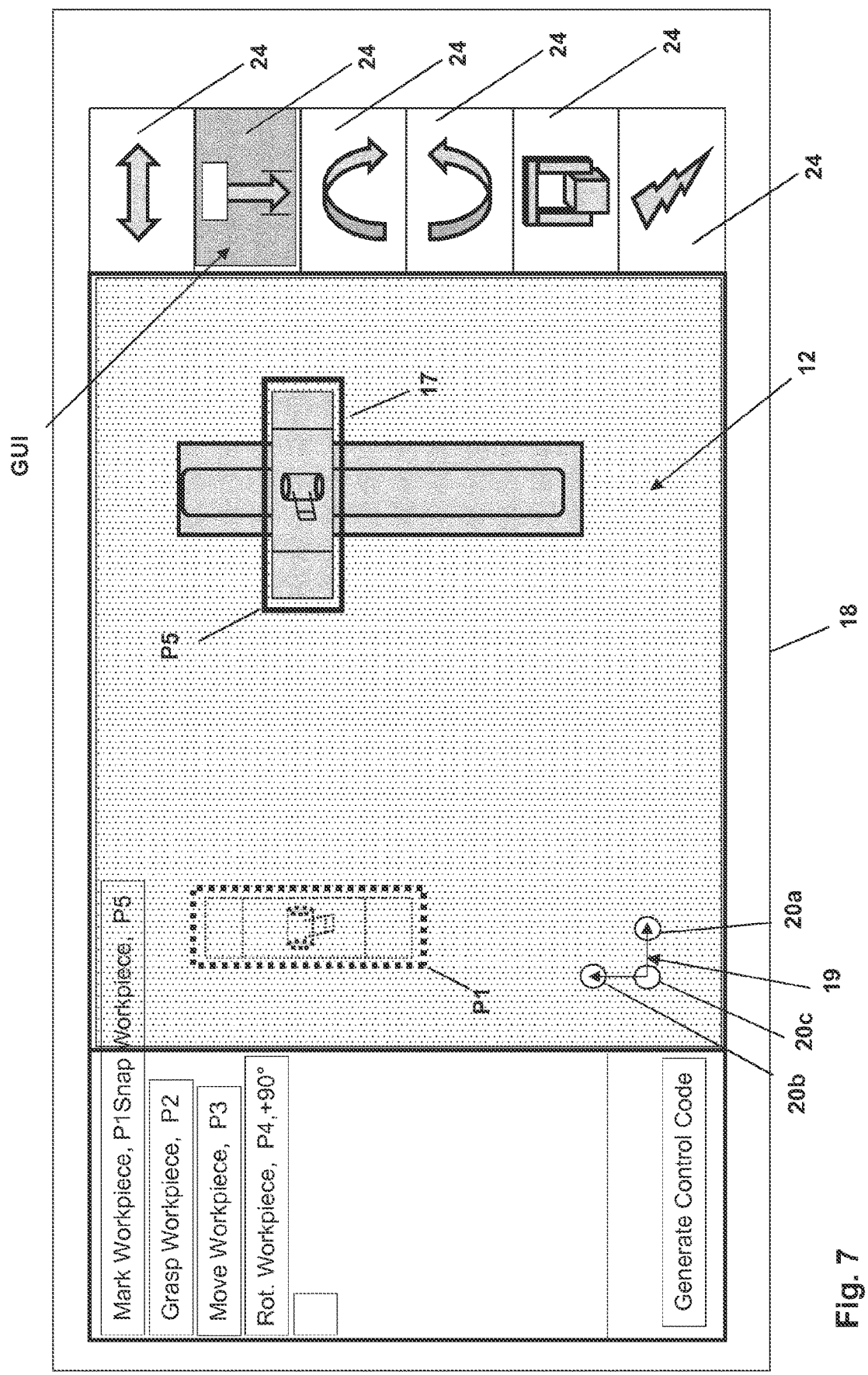
FIG. 7 shows the display with the graphical user interface after activating a control button for moving the robot tool downward to snap the workpiece (fuse) into the rail.
Figure 8:
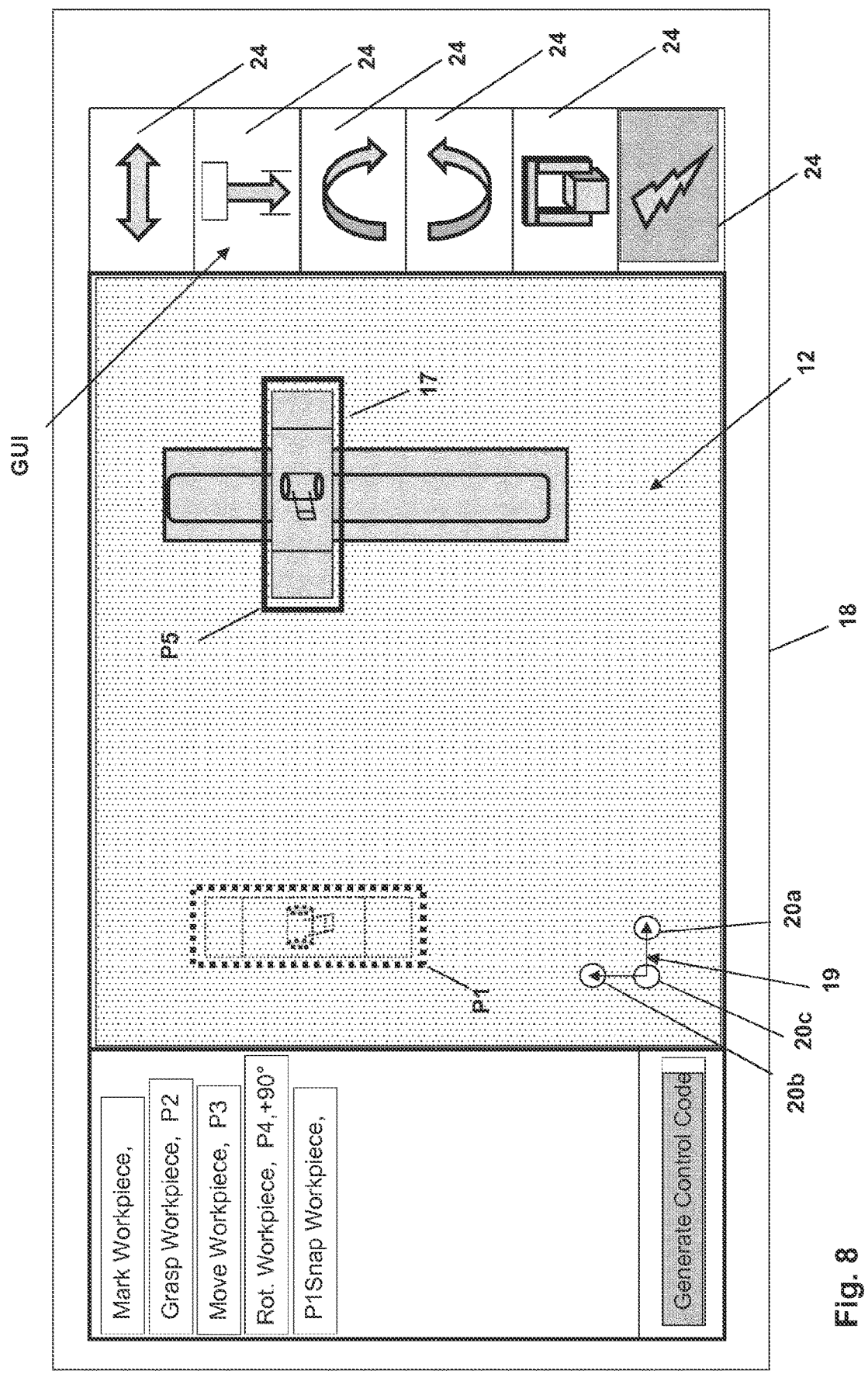
FIG. 8 shows the display with the graphical user interface after activating a control button for generating the control code including the sequence of manipulating steps which is transformed into a transformed sequence of manipulating steps in the target coordinate system of the workplace shown in FIG. 1.

In a subsequent step which is illustrated in FIG. 6, the operator activates a control button 24 which is related to a robot command which rotates the gripper/end-effector 4 clockwise as it is indicated by the arrow. The angle of rotation, which might also be input to the computing device by means of a keyboard is saved together with the new position P4 of the frame 17 to the sequence of manipulating steps.

In a last manipulating step, the operator activates a control button 24 which is related to a robot command which lowers the gripper and presses the workpiece into the rail where the frame 17 (or to be precise the lower left edge of the frame) is lowered to a target position P5 in which the workpiece 12 snaps into the rail positioned in the workplace 10. The robot 1 may be equipped with a sensor and close loop control which autonomously moves the gripper 4 of the robot 1 to the exact position relative to the rail in which the workpiece (fuse) 8 snaps into a recess provided in the rail.

Figure 9:
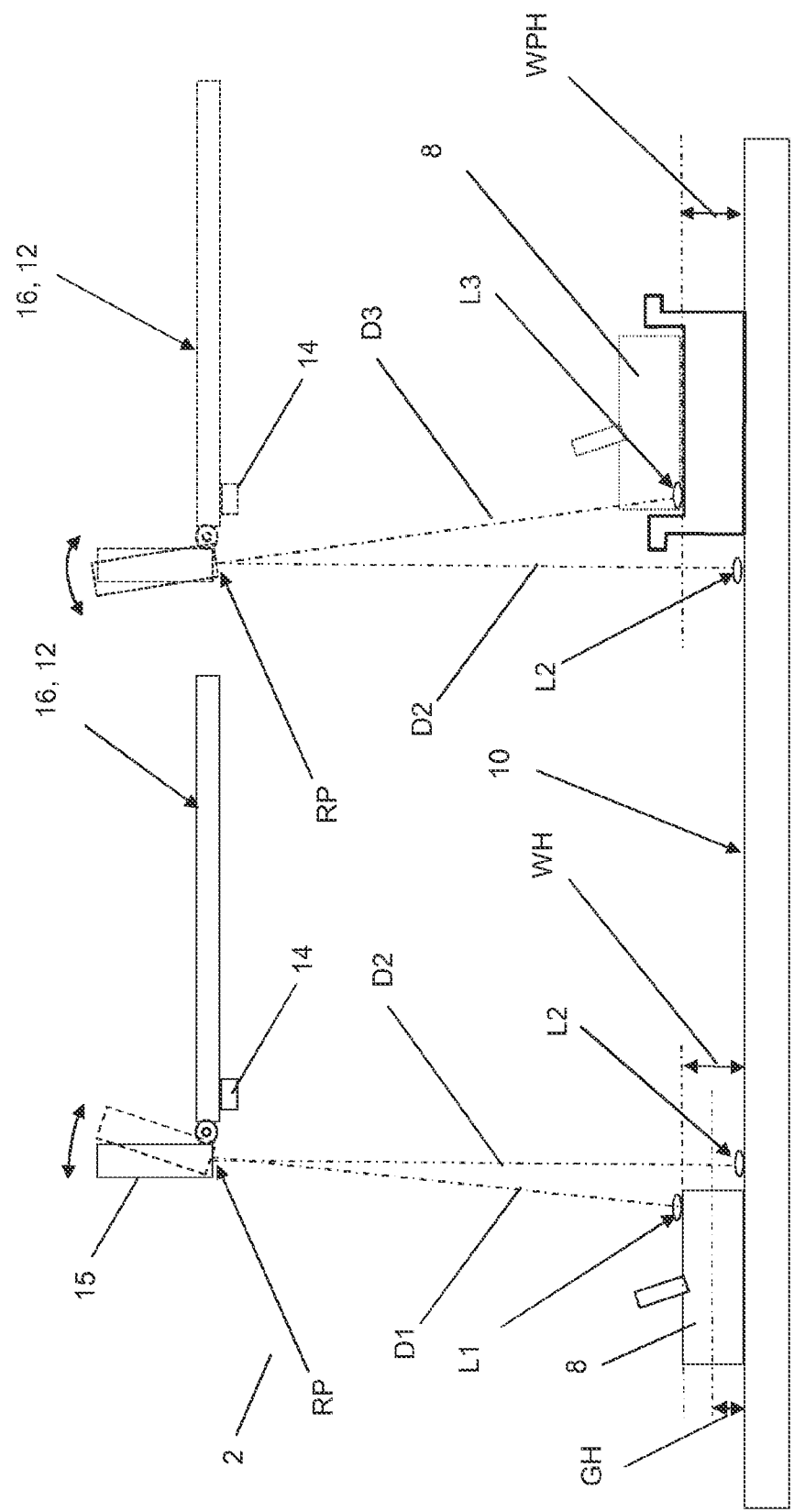
FIG. 9 is a schematic overview of an alternative embodiment of the method, in which the distance information for more precisely manipulating the workpiece is obtained by means of a laser-rangefinder.

In order to also account for the target height of the workpiece on the workplace 10 when controlling the robot 1, which is important if the workpiece must be positioned on top of another object on the workplace in the final target position, a third distance value D3 between the reference point RP and a third measuring location L3 on the workplace 10 is determined, as it is illustrated in FIG. 9. This third measuring location D3 corresponds to a prospected target position P5 of the workpiece 8 on the workplace 10 (see FIG. 8) after performing the sequence of manipulating steps. From the measured third distance value L3, a workpiece positioning height value WPH which is associated to the workpiece 8 in the target position P5 is determined as the mathematical difference between the measured third distance value D3 and the measured second distance value D2, that is the measured distance between the reference point RP and the even plane of the workplace 10 adjacent the target position P5. In the same way as described hereinbefore with regard to the workpiece height value WH, also the workpiece positioning height value WPH is afterwards used to generate the control code and associated robot commands for controlling the robot 1.

After this step, the operator can activate a button which activates the computing device 16 to transform the collected position data P1 to P5 and G1, G2 in the sequence of manipulating steps to coordinates P1' to P5' in the target coordinate system 11 and generate the control code for the robot 1. The control code may be transferred to the robot control unit 6 automatically.

According to another object of the invention, the image capturing device 14 may capture the image 12 of the workplace 10 together with the associated measured distance values for a plurality of predetermined pixels which are located at positions distributed all over the captured image 12. Although the predetermined pixels may be all pixels of the captured image 12, the required computing power can be significantly reduced without reducing the visual resolution of any objects on the display 18 if e.g. only every second or 5th ore even $10^{th}$ pixel of the image is elected by the computing device as a predetermined pixel for which the associated distance value is retrieved.

For each of the predetermined pixels of the captured image 12, the computing device then determines an obstacle height value which is the calculated difference between the first measured distance value D1 and the measured distance value which is associated to a corresponding one of the predetermined pixels. After calculating the obstacle height value for each of the predetermined pixels, the calculated obstacle height values are compared with a predetermined value for the maximum lifting-height of the end-effector 4 which may be manually input once into the computing device for each robot 1 or stored therein. If an object height value exceeds the predetermined maximum lifting-height value, the computing device marks the corresponding predetermined pixel and displays it in the captured image 12 as a colliding object 26. This may be achieved by increasing the brightness of the pixel or by changing the color of the pixel, e.g. to red.

Figure 10:
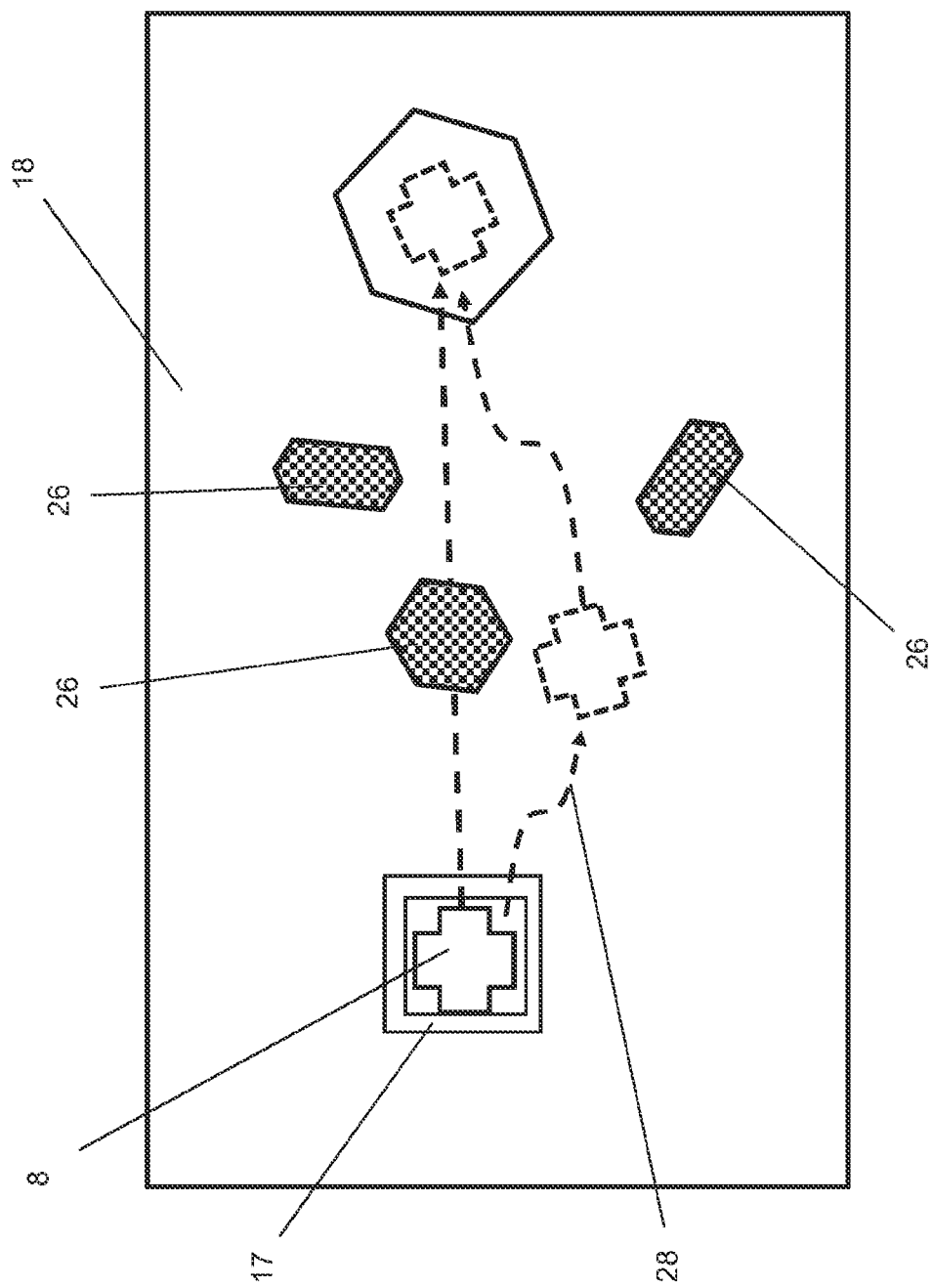
FIG. 10 is a schematic alternative path proposed by the computing device when a potential collision of the workpiece has been determined.

As it is shown in FIG. 10, the computing device 16 may afterwards calculate a proposed non-collision path or trajectory 28 from the determined obstacle height values, on which the workpiece 8 may be moved around the marked (highlighted) pixels or clusters of marked pixels, in order to help the operator to choose the most appropriate path for moving the marker-object 17 on the display 18 from the initial position P1 to the final position P5 without colliding with any of the marked colliding objects/obstacles 26.

According to a further embodiment of the invention, the image capturing device 14 may capture the image 12 of the workplace 10 together with the associated measured distance values for the plurality of predetermined pixels as described herein before, and may additionally or optionally determine, if the calculated difference between the first measured distance value D1 related to the distance of the plane of the workplace 10 and a measured distance value which is associated to each of the predetermined pixels, respectively, is larger than the grasping-height value GH. In case that the measured distance value, which is preferably retrieved from the file of the captured image taken by the 3-D camera 14, exceeds the grasping height value GH, the involved pixel is marked by the computing device 16 and afterwards displayed in the captured image 12 on the display 18 as a graspable object.

According to an alternative embodiment of the invention which is shown in FIG. 9, the first distance value D1 and the second distance value D2 as well as the third distance value D3 are measured by means of a rangefinder 15 which comprises a light source that emits a light beam which generates a first light spot on the workpiece 8 at the first measuring location L1 and a second light spot at the second measuring location L2 on the workplace (10), when directing the rangefinder (15) on the workpiece (8) or on the workplace (10), respectively. To do so, the rangefinder 15 is pivotally mounted to the image capturing device 14 which in the embodiment of FIG. 9 is included in a touchpad which also includes the computing device 16 and the GUI and HMI etc. In order to measure the first, second and third distances D1 and D2 from a reference point RP, the rangefinder 15 is positioned above the workplace preferably at a location which is positioned right above the workpiece 8, so that the angle between the light beam and the normal at the first and second measuring location L1, L2 on the workpiece 8 and on the workplace 10 is as small as possible. After measuring the first distance D1, the pathfinder 15 or the entire touchpad is slightly pivoted and the second distance D2 is measured. From the measured distance values D1 and D2, which may be displayed on a display screen of the pathfinder 15 the mathematical difference is calculated and entered into the touchpad as the workpiece height value WH.

In order to measure the third distance D3 at the third measuring location L3 which is required for calculating the workpiece positioning height WPH, the touchpad may be moved sideward and positioned right above the prospected target location P5 of the workpiece 8, which is schematically represented by the rail in FIG. 9. In order to reduce the measuring error as much as possible, the second distance D2 between the reference point RP (e.g. the front end of the housing of the pathfinder 15) and the workplace 10 may be measured again at a location L2 which is close to the prospected target position P5, as it is schematically shown in FIG. 9. In the same way as described herein before with respect to the workpiece height value WH, the workpiece positioning height value WPH is then calculated as the mathematical difference between the measured distances D2 and D3, and the value input into the computing device 16.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS 1 robot
2 robot arm
4 end-effector (tool)
6 robot control unit
8 workpiece
10 workplace of robot
11 target coordinate system
12 captured image
14 capturing device/camera)
15 rangefinder (15)
16 computing device
17 marker-object
18 display
19 coordinate system of display
20a reference point
20b reference point
20c reference point
22a bar
22b bar
24 control button
26 colliding objects
28 proposed path
GUI graphical user interface
HMI human-machine-interface
G1, 2 grasping position
P1-P5 positions of marker-object
P1'-P5' transformed positions
D1 first distance value
D2 second distance value D3 third distance value
L1 first measuring location
L2 second measuring location
L3 third measuring location
RP reference point
WH workpiece height value
GH workpiece grasping height value
WPH workpiece-positioning height val.

What is claimed is:

1. A method of programming an industrial robot, comprising:
providing the robot, the robot having a robot arm with an end-effector mounted thereto which is controlled by a robot control unit to manipulate a workpiece which is arranged in a workplace of the robot;
associating a target coordinate system with the workplace;
capturing an image of the workplace and the workpiece by an image capturing device;
transmitting the image to a computing device having a human-machine-interface to generate control code for controlling the robot, which is transmitted to the robot control unit;
displaying the image on a display associated with the computing device;
displaying the workpiece on the display;
marking the workpiece with a marker-object on the display;
manipulating the marker-object in a sequence of at least two subsequent manipulating steps which are associated with robot commands on the display by means of the human-machine-interface, the sequence of manipulating steps including positions of the marker-object in a coordinate system for displaying the marker-object on the display;
transforming the positions of the marker-object in the sequence of manipulating steps to positions of the workpiece in the target coordinate system;
generating control code for controlling the robot from the transformed positions and associated robot commands;
measuring a first distance value between a reference point which is located above the workpiece and a first measuring location on the workpiece;
measuring a second distance value between the reference point and a second measuring location on the workplace;
determining a workpiece height value associated with the workpiece as a difference between the measured first distance value and the measured second distance value; and
generating the control code and associated robot commands for controlling the robot based on the workpiece height value;
wherein the image capturing device comprises a 3D-camera which captures the image of the workplace together with measured distance values associated with at least some of the pixels of the captured image;
wherein the first distance value used in determining the workpiece height value is associated with a first pixel of the captured image, the first pixel being located at the first measuring location, and the second distance value used in determining the workpiece height value is associated with a second pixel of the captured image, the second pixel being located at the second measuring location;
wherein the first measuring location is located within the marker-object after marking the workpiece;
wherein the second measuring location is located outside of and adjacent to the marker-object; and
wherein the first pixel and/or the second pixel are selectable by the human-machine-interface on the display.

2. The method of claim 1, wherein a workpiece grasping height value is determined from the workpiece height value as a value which is smaller.

3. The method of claim 2, wherein the sequence of manipulating steps includes:
providing two parallel bars on the display;
moving the two parallel bars to the marker-object by using the human-machine-interface;
rotating the parallel bars and moving the parallel bars towards and away from each other in order to define a grasping position of gripper bars at which the workpiece is grasped by the robot;
storing the grasping position together with the associated workpiece grasping height value;
transforming the grasping position and the associated workpiece grasping height value to a transformed grasping position and an associated workpiece grasping height value of the workpiece in the target coordinate system; and
generating the control code for controlling the robot based on the transformed grasping position and the grasping height value.

4. The method according to claim 1, further comprising:
determining a third distance value between the reference point and a third measuring location on the workplace, the third measuring location corresponding to a target position of the workpiece on the workplace after performing the sequence of manipulating steps;
determining a workpiece positioning height value associated with the workpiece in the target position as a difference between the measured third distance value and the measured second distance value; and
generating the control code and associated robot commands for controlling the robot based on the workpiece-positioning height value.

5. The method of claim 1, wherein the image capturing device captures the image of the workplace together with the associated measured distance values for a plurality of predetermined pixels which are located at positions distributed all over the captured image,
wherein for each of the predetermined pixels an obstacle height value is determined as a calculated difference between the first measured distance value associated with the first pixel on the workplace and a corresponding measured distance value associated with a predetermined pixel, and
wherein pixels of the plurality of predetermined pixels for which the obstacle height value exceeds a predetermined value for a maximum lifting-height of the end-effector are marked and displayed in the captured image on the display as colliding objects.

6. The method according to claim 5, wherein based on the determined obstacle height values, the computing device generates a proposed path for moving the workpiece around the marked pixels or clusters of marked pixels in the captured image which are displayed on the display.

7. The method according to claim 1, wherein the image capturing device captures the image of the workplace together with the associated measured distance values for a plurality of predetermined pixels which are located at positions distributed all over the captured image,
wherein each of the predetermined pixels for which the calculated difference between the first measured distance value associated with the first pixel on the workplace and a corresponding measured distance value associated with a predetermined pixel is larger than the grasping-height value, is marked and displayed in the captured image on the display as a graspable object.

8. The method according to claim 1, wherein the computing device comprises a handheld device having a touchscreen display with the 3D-camera integrated therein or mechanically attached thereto.

9. The method of claim 2, wherein the workpiece grasping height value is 50% smaller than the workpiece height value.

10. A method of programming an industrial robot, comprising:
- providing the robot, the robot having a robot arm with an end-effector mounted thereto which is controlled by a robot control unit to manipulate a workpiece which is arranged in a workplace of the robot;
- associating a target coordinate system with the workplace;
- capturing an image of the workplace and the workpiece by an image capturing device;
- transmitting the image to a computing device having a human-machine-interface to generate control code for controlling the robot, which is transmitted to the robot control unit;
- displaying the image on a display associated with the computing device;
- displaying the workpiece on the display;
- marking the workpiece with a marker-object on the display;
- manipulating the marker-object in a sequence of at least two subsequent manipulating steps which are associated with robot commands on the display by means of the human-machine-interface, the sequence of manipulating steps including positions of the marker-object in a coordinate system for displaying the marker-object on the display;
- transforming the positions of the marker-object in the sequence of manipulating steps to positions of the workpiece in the target coordinate system;
- generating control code for controlling the robot from the transformed positions and associated robot commands;
- measuring a first distance value between a reference point which is located above the workpiece and a first measuring location on the workpiece;
- measuring a second distance value between the reference point and a second measuring location on the workplace;
- determining a workpiece height value associated with the workpiece as a difference between the measured first distance value and the measured second distance value; and
- generating the control code and associated robot commands for controlling the robot based on the workpiece height value;
- wherein the first distance value and the second distance value are measured by a rangefinder which comprises a light source comprising a laser that emits a light beam which is configured to generate a first light spot on the workpiece and a second light spot on the workplace, when directing the rangefinder on the workpiece or on the workplace, respectively, for measuring the first and second distance;
- wherein the measured first distance value and the measured second distance value or the workpiece height value calculated as the mathematical difference of both measured distance values are manually input into the computing device by the human-machine-interface before or after marking the workpiece to be manipulated with the marker-object; and
- wherein the workpiece height value is associated with an initial position of the marker-object in the coordinate system for displaying the marker-object in the captured image on the display.

\* \* \* \* \*